United States Patent [19]

Phebus et al.

[11] Patent Number: 5,024,636
[45] Date of Patent: Jun. 18, 1991

[54] PLANETARY WHEEL HUB

[75] Inventors: Dan E. Phebus, Rossville; William A. Schrader, Lafayette; Russell E. Summers, Jr., West Lafayette, all of Ind.

[73] Assignee: Fairfield Manufacturing Company, Inc., Lafayette, Ind.

[21] Appl. No.: 372,020

[22] Filed: Jun. 27, 1989

[51] Int. Cl.[5] .............................................. F16H 57/10
[52] U.S. Cl. ...................................... 475/141; 475/321
[58] Field of Search ......................... 74/785, 786, 787; 192/4 A, 18 A, 91 A; 180/370, 372; 475/317, 320, 321, 322, 140, 141

[56] References Cited

U.S. PATENT DOCUMENTS

| 3,115,204 | 12/1963 | Dence | 180/372 |
|---|---|---|---|
| 4,010,830 | 3/1977 | Logus et al. | 192/4 A |
| 4,160,497 | 7/1979 | Galicher | 192/4 A |
| 4,181,042 | 1/1980 | Rau et al. | 74/750 R |
| 4,186,626 | 2/1980 | Chamberlain | 74/801 |
| 4,516,444 | 5/1985 | Herr, Jr. | 475/141 |
| 4,540,073 | 9/1985 | Rogier | 192/4 A |
| 4,573,561 | 3/1986 | Deem et al. | 192/91 A |
| 4,607,730 | 8/1986 | Paisley | 192/91 R |
| 4,676,123 | 6/1987 | Kubo et al. | 192/4 A X |

FOREIGN PATENT DOCUMENTS

| 488062 | 12/1929 | Fed. Rep. of Germany | 74/785 |
|---|---|---|---|
| 139287 | 7/1960 | U.S.S.R. | 74/785 |

Primary Examiner—Dwight Diehl
Attorney, Agent, or Firm—Woodling, Krost & Rust

[57] ABSTRACT

A two-ratio planetary hub utilizes spring applied pressure release clutches between the sun gear and planet carrier and ring gear to stationary housing to provide selectable ratios, braking and neutral functions.

33 Claims, 2 Drawing Sheets

PLANETARY WHEEL HUB

This invention relates to a planetary wheel hub as its primary configuration. It should be noted this invention is not limited to embodiment within the wheel spindle of mobile vehicles.

OBJECTS OF INVENTION

It is an object of this invention to integrate two selectable gear ratios, braking and neutral conditions into a wheel hub.

It is an object of this invention to produce a balanced design utilizing two spring applied pressure released clutch packs.

It is an object of this invention to provide control for clutch packs with non-rotating pistons.

It is an object of this invention to provide a default braking condition and a selectable neutral position.

It is an object of this invention to reduce the axial length of wheel hubs.

It is an object of this invention to allow the underload or no-load and/or under-rotation or no-rotation interchange of ratios in a planetary wheel hub.

Other objects and a more complete understanding of the invention may be had by referring to the following drawing and specification.

DRAWING

SPECIFICATION

Figure 1:
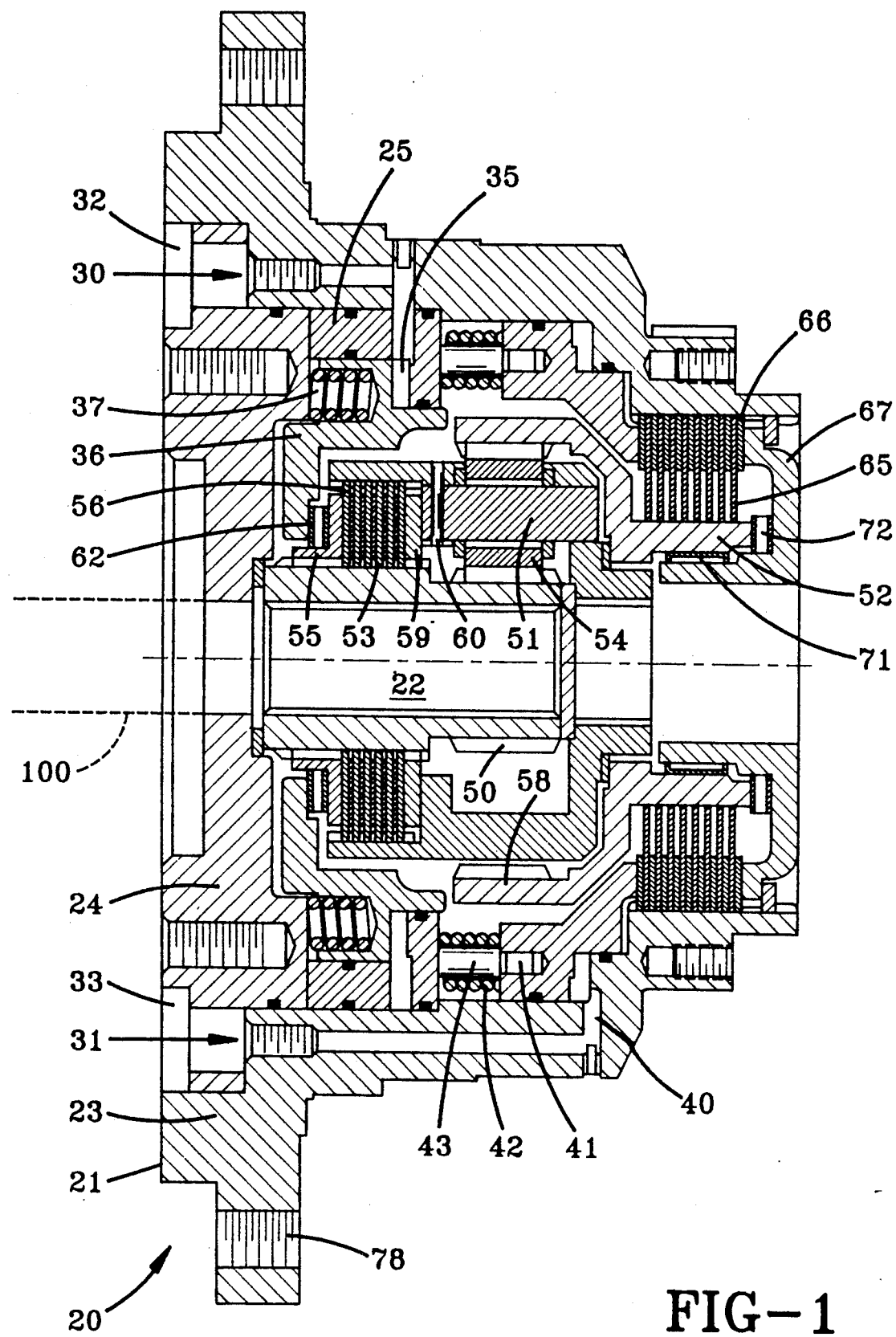
FIG. 1 is a longitudinal cross-section of a planetary transmission sub-assembly incorporating the invention of the application.
Figure 2:
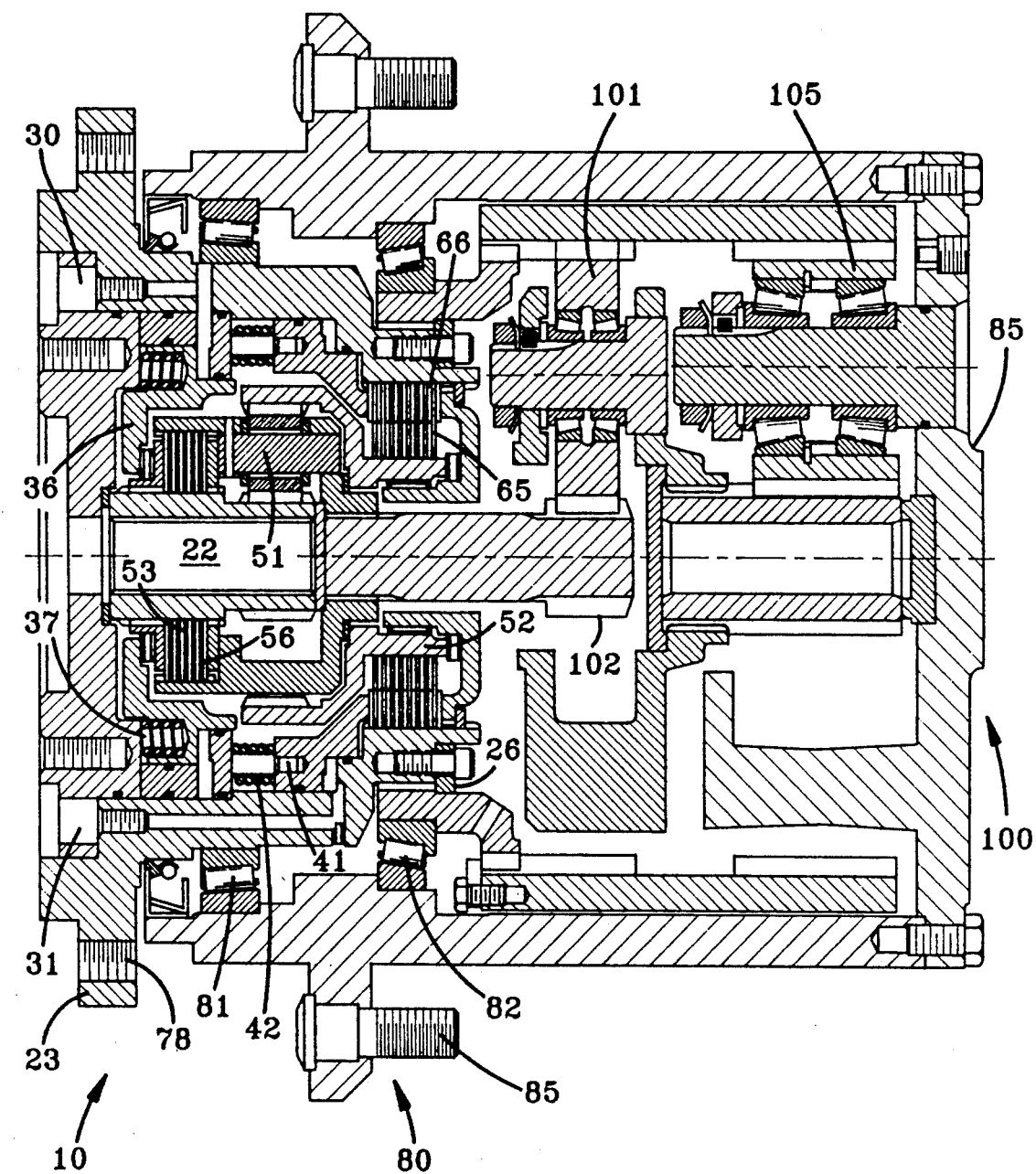
FIG. 2 is a longitudinal cross-section of a planetary wheel hub incorporating the planetary transmission sub-assembly of FIG. 1.

The preferred embodiment of the invention is a planetary wheel hub 10. This wheel hub includes a spindle sub-assembly 20, a surrounding hub 80, and a final drive 100.

The spindle sub-assembly 20 is the main operational transmission section for the wheel hub 10. The sub-assembly 20 includes a stationary housing 21 and a planetary drive system with two clutch packs 22.

The stationary housing 21 serves as both the container for the clutch pack planetary drive system 22 and as the physical support for the hub 80. The stationary housing 21 is of multi-piece construction having a housing 23, an input cover 24, a piston spacer 25, and a bearing carrier 67 all fixedly connected together so as to form an integral whole. The housing 23 is a large single piece item that provides substantially all of the physical support for the hub 80. The input cover 24 shown is bolted to one side of the housing 23 capturing the piston spacer 25 therebetween with the bearing carrier 67 retained to the other side of the housing 23 by a retaining ring. Two fluid passages 30/31 extend through the stationary housing 21 from ports 32/33 in the housing 23. The fluid passage 30 terminates in a chamber 35 located behind a piston 36 partially captured between one side of the piston spacer 25 and input cover 24. A set of heavy springs 37 captured in holes in the piston 36 biases the piston 36 towards the chamber 35. The fluid passage 31 terminates in a chamber 40 located in front of a piston 41 between it and the housing 23. A second set of heavy springs 42 biases the piston 41 towards the chamber 40. Spring rods 43, connected to the piston 41, keep the springs 42 in place. (Purposes of pistons and their operation later described).

The planetary drive system 22 is located within the stationary housing 21. This drive system 22 includes a sun gear 50, a planetary gear set 51, a ring gear 52, and two clutch packs 53/56, 65/66.

The sun gear 50 is the main drive input for the wheel hub 10. This sun gear 50 is connected to a shaft (dotted lines 100) running from the engine for the vehicle, normally through a main vehicle speed change transmission. If the hub 10 shown is utilized in respect to a wheel that turns to change the direction of the vehicle, appropriate universals are included in this shaft. The gears 54 of the planetary gear set 51 surround the sun gear 50 drivingly interconnected thereto. A first set of clutch plates 53 extends off of the sun gear 50 between a fixed retaining ring 59 and an axially movable engagement member 55. A second set of clutch plates 56 extends off of the planet carrier 58 interleaved with the first set 53. (Roll pins 60 connects the planetary gears to the carrier 58). The piston 36 is spring loaded so as to normally drivingly engage the two sets of plates 53, 56. This ties the carrier 58 to the sun gear 50 for rotation therewith in the absence of fluid pressure at the port 32. (A thrust bearing 62 allows the engagement member 55 to rotate with the sun gear 50 while the piston 36 remains stationary).

The planetary gear set 51 is the main ratio change/braking/neutral operational member for the wheel hub 10. The ring gear 52 surrounds the planet gears 54 of the planetary gear set 51 for selective rotation in respect thereto. A first set of clutch plates 65 extends off of the ring gear 52 interleaved with a second set of clutch plates 66. The second set of clutch plates 66 extends off of the stationary housing 21 between a bearing carrier 67 and an axially movable piston 41. The bearing carrier 67 holds the ring gear 52 in radial position via the radial bearings 71. A second set of axial bearings 72 extends between the ring gear 52 and the bearing carrier 67. The piston 41 extends off of the housing 21 adjacent to one side of the clutch plates 65/66. The piston 41 is spring loaded to normally drivingly engage the two sets of plates 65/66. This ties the ring gear 52 to the stationary housing 21 to prevent the rotation of the ring gear 52 in the absence of fluid pressure at the port 33.

The clutch packs 53/56 and 65/66 are radially overlapping axially spaced from each other. This is also true of the pistons 36/41 and springs 37/42. These orientations each allow the spindle transmission assembly 20 to be compact. This compactness allows the transmission assembly 20 to be included in applications such as inside a wheel hub and other size limited applications.

The clutch sets 53/56 and 65/66 have two operational conditions apiece, spring interconnection and piston controlled, giving the device four total conditions.

The dual spring interconnection conditions are those described above wherein the springs 37 bias the piston 36 against the plates 53/56 so as to drivingly interconnect the sun gear 50 to the planet carrier 58 and the springs 42 bias the piston 41 against the plates 65/66 so as to interconnect the ring gear 52 to the stationary housing 21. This double spring interconnection prevents the rotation of the sun gear 50 to the limitation of the weaker of the holding power of the two sets of plates 53/56 or 65/66. This is the default condition of the transmission assembly 20.

If the fluid passage 31 and the chamber 40 is pressurized by itself, piston 41 will be moved against the force of the springs 42. This will allow the plates 65 and ring gear 52 to rotate. If the sun gear 50 is then driven, the planet carrier 58 will rotate in the same direction at the same speed as the sun gear 50 (tied together by plates 53/56).

If the fluid passage 30 and the chamber 35 is pressurized by itself, the piston 36 will be moved against the force of the springs 37. This will allow the plates 53 and the sun gear 50 to rotate. If the sun gear 50 is then driven, the planet carrier 58 will rotate in the same direction as the sun gear 50 at a reduced speed of the ratio of the planetary.

If both fluid passages 30, 31 are both pressurized, both sets of plates 53/56 and 65/66 will be free wheeling. If the sun gear 52 is driven, the planet carrier 58 will not rotate.

The spindle sub-assembly 20 is located within a surrounding hub 80. This hub 80 is supported by two sets of heavy bearings 81/82 for rotation in respect to the stationary housing 21. The bearing plate 26 retains the bearings 81/82 in position.

The final drive 100 interconnects the planet carrier 58 with the surrounding hub 80. The particular final drive 100 shown is a double reduction planetary drive. The first set of planetary gears 101 interconnects a shaft 102 extending off of the planet carrier 58 to the second set of planetary gears 105. The second set of planetary gears 105 interconnects the carrier of the first set of planetary gears 101 to the surrounding hub 80 via the interconnection of its carrier to the end cover 85 of the hub 80. The end cover 85 is removable bolted to the hub 80. This allows the final drive 100 to be replaced with same or differing ratio drives without jacking up the vehicle or otherwise removing the weight load from the hub 80. Other final drives could also be utilized including a direct carrier 58 output. The parts of the planetary transmission can be accessed similarly by unbolting the input cover 24 from the housing 23 (dropping the shaft 100, if needed).

The wheel for the vehicle is mounted to the hub 80 by bolts 85. In that the housing 23 of the stationary housing 21 is bolted to the frame or turning carrier of the vehicle (by holes 78), most of the forces on the hub 80 are efficiently transferred directly to the vehicle. There are no significant loads on the transmission assembly 20 or its individual parts except for the rotational driving stopping forces previously described.

Although this invention has been described in its preferred form with a certain degree of particularity, it is to be understood that numerous changes may be had without departing from the invention as hereinafter claimed.

What is claimed is:

1. A planetary transmission comprising a sun gear, means to rotate said sun gear, planet gears, said planet gears surrounding said sun gear, a planet carrier, means to connect said planet gears to said planet carrier, means to connect said planet carrier to an output for the transmission, a first clutch pack, a first set of springs, said first set of springs activating said first clutch pack to connect said planet carrier to said sun gear for rotation therewith, a first means to override said first set of springs to disconnect said planet carrier from said sun gear, a stationary housing, a ring gear, said ring gear surrounding said planet gears, a second clutch pack, a second set of springs, said second set of springs activating said second clutch pack to connect said ring gear to said stationary housing to prevent the rotation of said ring gear, a second means to override said second set of springs to disconnect said ring gear from said stationary housing and operation means to selectively operate said first and second means so as to alter the operative condition of the planetary transmission so as to provide a first drive condition with operation of said first means, a second drive condition with operation of said second means and a braking condition with both said first and second clutch packs activated.

2. The planetary transmission of claim 1 characterized in that said first clutch pack and said second clutch pack each include portions radially overlapping the other.

3. The planetary transmission of claim 2 characterized in that said first clutch pack and said second clutch pack are axially spaced from each other.

4. The planetary transmission of claim 1 characterized in that said first and second means include movable pistons.

5. The planetary transmission of claim 4 characterized in that one of the pistons of said first means and the piston of said second means is stationary and is connected to its respective clutch pack through a bearing that allows the rotation of the respective clutch pack.

6. The planetary transmission of claim 1 characterized by the addition of a rotational wheel hub and said planetary transmission being within said rotational wheel hub.

7. The planetary transmission of claim 6 wherein said stationary housing is one piece and said rotational wheel hub is supported by bearings to said stationary housing.

8. The planetary transmission of claim 6 characterized by the addition of a final drive and said final drive rotationally interconnecting said output of the transmission to said rotational wheel hub.

9. The planetary transmission of claim 1 wherein the planetary transmission has two ratios, neutral and braking operative conditions.

10. The planetary transmission of claim 1 characterized in that said second set of springs is axially displaced from said second clutch pack.

11. The planetary transmission of claim 1 characterized by said operation means providing a neutral condition with operation of both said first means and said second means.

12. A planetary transmission comprising a sun gear, means to rotate said sun gear, planet gears, said planet gears surrounding said sun gear, a planet carrier, means to connect said planet gears to said planet carrier, means to connect said planet carrier to an output for the transmission, a first clutch pack, a first set of springs, said first set of springs activating said first clutch pack to connect said planet carrier to said sun gear for rotation therewith, a first means to override said first set of springs to disconnect said planet carrier from said sun gear, a stationary housing, a ring gear, said ring gear surrounding said planet gears, a second clutch pack, a second set of springs, said second set of springs activating said second clutch pack to connect said ring gear to said stationary housing to prevent the rotation of said ring gear, a second means to override said second set of springs to disconnect said ring gear from said stationary housing, operation means to selectively operate said first and second means so as to alter the operative condition of the planetary transmission, and said first set of springs biasing the movable piston of said first means in the same direction that said second set of springs biases the movable piston of said second means.

13. A planetary transmission comprising a sun gear, means to rotate said sun gear, planet gears, said planet gears surrounding said sun gear, a planet carrier, means to connect said planet gears to said planet carrier, means to connect said planet carrier to an output for the transmission, a first clutch pack, a first set of springs, said first set of springs activating said first clutch pack to connect said planet carrier to said sun gear for rotation therewith, a first means to override said first set of springs to disconnect said planet carrier from said sun gear, a stationary housing, a ring gear, said ring gear surrounding said planet gears, a second clutch pack, a second set of springs, said second set of springs activating said second clutch pack to connect said ring gear to said stationary housing to prevent the rotation of said ring gear, a second means to override said second set of springs to disconnect said ring gear from said stationary housing, operation means to selectively operate said first and second means so as to alter the operative condition of the planetary transmission and said first set of springs and said second set of springs including portions, radially overlapping the other.

14. A planetary transmission comprising a sun gear, means to rotate said sun gear, planet gears, said planet gears surrounding said sun gear, a planet carrier, means to connect said planet gears to said planet carrier, means to connect said planet carrier to an output for the transmission, a first clutch pack, a first set of springs, said first set of springs activating said first clutch pack to connect said planet carrier to said sun gear for rotation therewith, a first means to override said first set of springs to disconnect said planet carrier from said sun gear, a stationary housing, a ring gear, said ring gear surrounding said planet gears, a second clutch pack, a second set of springs, said second set of springs activating said second clutch pack to connect said ring gear to said stationary housing to prevent the rotation of said ring gear, a second means to override said second set of springs to disconnect said ring gear from said stationary housing, operation means to selectively operate said first and second means so as to alter the operative condition of the planetary transmission, a rotational wheel hub, said planetary transmission being within said rotational wheel hub, a final drive, said final drive rotationally interconnecting said output of the transmission to said rotational wheel hub, said final drive having a ratio and said ratio of said final drive being alterable without comprise to the interconnection of said rotational wheel hub to said stationary housing.

15. A planetary transmission comprising a sun gear, means to rotate said sun gear, planet gears, said planet gears surrounding said sun gear, a planet carrier, means to connect said planet gears to said planet carrier, means to connect said planet carrier to an output for the transmission, a first clutch pack, a first set of springs, said first set of springs activating said first clutch pack to connect said planet carrier to said sun gear for rotation therewith, a first means to override said first set of springs to disconnect said planet carrier from said sun gear, a stationary housing, a ring gear, said ring gear surrounding said planet gears, a second clutch pack, a second set of springs, said second set of springs activating said second clutch pack to connect said ring gear to said stationary housing to prevent the rotation of said ring gear, a second means to override said second set of springs to disconnect said ring gear from said stationary housing, operation means to selectively operate said first and second means so as to alter the operative condition of the planetary transmission, and said first set of springs being located axially overlapping said first clutch pack.

16. A planetary transmission comprising a sun gear, means to rotate said sun gear, planet gears, said planet gears surrounding said sun gear, a planet carrier, means to connect said planet gears to said planet carrier, means to connect said planet carrier to an output for the transmission, a first clutch pack, a first set of springs, said first set of springs activating said first clutch pack to connect said planet carrier to said sun gear for rotation therewith, a first means to override said first set of springs to disconnect said planet carrier from said sun gear, a stationary housing, a ring gear, said ring gear surrounding said planet gears, a second clutch pack, a second set of springs, said second set of springs activating said second clutch pack to connect said ring gear to said stationary housing to prevent the rotation of said ring gear, a second means to override said second set of springs to disconnect said ring gear from said stationary housing, operation means to selectively operate said first and second means so as to alter the operative condition of the planetary transmission, a piston spacer and said piston spacer axially overlapping said first and said second sets of springs.

17. A planetary transmission for a vehicle comprising stationary housing, means to connect said stationary housing to the vehicle, a sun gear, means to rotate said sun gear, planet gears, said planet gears surrounding said sun gear, a planet carrier, means to connect said planet gears to said planet carrier, a first clutch pack, a first set of stationary springs, said first set of springs activating said first clutch pack through a bearing that allows rotation of said first clutch pack to connect said planet carrier to said sun gear for rotation therewith, a first piston, said first piston overriding said first set of springs to disconnect said planet carrier from said sun gear, a ring gear, said ring gear surrounding said planet gears, a second clutch pack, a second set of stationary springs, said second set of springs activating said second clutch pack to connect said ring gear to said stationary housing to prevent the rotation of said ring gear, a second piston, said second piston overriding said second set of springs to disconnect said ring gear from said stationary housing, operation means to selectively move said first and second pistons to override their respective sets of springs so as to alter the operative condition of the planetary transmission, a rotational wheel hub, said rotational wheel hub being rotatively supported to said stationary housing by bearings and means to connect said planet carrier to said wheel hub so as to provide a first drive condition with operation of said first means, a second drive condition with operation of said second means and a braking condition with both said first and second clutch packs activated.

18. The planetary transmission of claim 17 characterized in that said first clutch pack and said second clutch pack partially radially overlap each other and said first clutch pack being axially displaced from said second clutch pack.

19. The planetary transmission of claim 17 characterized by said operation means providing a neutral condition with operation of both said first means and said second means.

20. A planetary transmission for a vehicle comprising stationary housing, means to connect said stationary housing to the vehicle, a sun gear, means to rotate said sun gear, planet gears, said planet gears surrounding said sun gear, a planet carrier, means to connect said planet gears to said planet carrier, a first clutch pack, a first set of stationary springs, said first set of springs activating said first clutch pack through a bearing that allows rotation of said first clutch pack to connect said planet carrier to said sun gear for rotation therewith, a first piston, said first piston overriding said first set of springs to disconnect said planet carrier from said sun gear, a ring gear, said ring gear surrounding said planet gears, a second clutch pack, a second set of stationary springs, said second set of springs activating said second clutch pack to connect said ring gear to said stationary housing to prevent the rotation of said ring gear, a second piston, said second piston overriding said second set of springs to disconnect said ring gear from said stationary housing, operation means to selectively move said first and second pistons to override their respective sets of springs so as to alter the operative condition of the planetary transmission, a rotational wheel hub, said rotational wheel hub being rotatively supported to said stationary housing by bearings, means to connect said planet carrier to said wheel hub, and said first piston and said second piston moving axially of the stationary housing in the same direction in overriding said first and second sets of springs respectively.

21. A planetary transmission for a vehicle comprising stationary housing, means to connect said stationary housing to the vehicle, a sun gear, means to rotate said sun gear, planet gears, said planet gears surrounding said sun gear, a planet carrier, means to connect said planet gears to said planet carrier, a first clutch pack, a first set of stationary springs, said first set of springs activating said first clutch pack through a bearing that allows rotation of said first clutch pack to connect said planet carrier to said sun gear for rotation therewith, a first piston, said first piston overriding said first set of springs to disconnect said planet carrier from said sun gear, a ring gear, said ring gear surrounding said planet gears, a second clutch pack, a second set of stationary springs, said second set of springs activating said second clutch pack to connect said ring gear to said stationary housing to prevent the rotation of said ring gear, a second piston, said second piston overriding said second set of springs to disconnect said ring gear from said stationary housing, operation means to selectively move said first and second pistons to override their respective sets of springs so as to alter the operative condition of the planetary transmission, a rotational wheel hub, said rotational wheel hub being rotatively supported to said stationary housing by bearings, means to connect said planet carrier to said wheel hub, said stationary housing being hollow and substantially all of the parts of the planetary transmission being contained within said stationary housing.

22. A planetary transmission for a vehicle comprising stationary housing, means to connect said stationary housing to the vehicle, a sun gear, means to rotate said sun gear, planet gears, said planet gears surrounding said sun gear, a planet carrier, means to connect said planet gears to said planet carrier, a first clutch pack, a first set of stationary springs, said first set of springs activating said first clutch pack through a bearing that allows rotation of said first clutch pack to connect said planet carrier to said sun gear for rotation therewith, a first piston, said first piston overriding said first set of springs to disconnect said planet carrier from said sun gear, a ring gear, said ring gear surrounding said planet gears, a second clutch pack, a second set of stationary springs, said second set of springs activating said second clutch pack to connect said ring gear to said stationary housing to prevent the rotation of said ring gear, a second piston, said second piston overriding said second set of springs to disconnect said ring gear from said stationary housing, operation means to selectively move said first and second pistons to override their respective sets of springs so as to alter the operative condition of the planetary transmission, a rotational wheel hub, said rotational wheel hub being rotatively supported to said stationary housing by bearings, means to connect said planet carrier to said wheel hub, said means to connect said planet carrier to said wheel hub including a final drive, said final drive having a ratio, and said ratio of said final drive being alterable without compromise to the interconnection of said wheel hub to said stationary housing.

23. A planetary transmission for a vehicle comprising stationary housing, means to connect said stationary housing to the vehicle, a sun gear, means to rotate said sun gear, planet gears, said planet gears surrounding said sun gear, the outer of said planet gears being spaced from the axis of said sun gear by a first distance, a planet carrier, means to connect said planet gears to said planet carrier, a first clutch pack, a first set of stationary springs, said first set of springs activating said first clutch pack through a bearing that allows rotation of said first clutch pack to connect said planet carrier to said sun gear for rotation therewith, a first piston, said first piston overriding said first set of springs to disconnect said planet carrier from said sun gear, a ring gear, said ring gear surrounding said planet gears, said ring gear having a section displaced laterally of said planet gears, said section being spaced form the axis of sun gear by a second distance, said second distance being less than said first distance, a second clutch pack, a second set of stationary springs, said second set of springs activating said second clutch pack to connect said laterally displaced section of said ring gear to said stationary housing to prevent the rotation of said ring gear, a second piston, said second piston overriding said second set of springs to disconnect said laterally displaced section of said ring gear from said stationary housing to allow the rotation of said ring gear, and operation means to selectively move said first and second pistons to override their respective sets of springs so as to alter the operative condition of the planetary transmission.

24. The planetary transmission of claim 23 characterized in that said first clutch pack is located radially inward of said planet carrier inside of said first distance from the axis of said sun gear.

25. The planetary transmission of claim 23 characterized in that said first clutch pack is located on the same side of said sun gear as said means to rotate said sun gear.

26. The planetary transmission of claim 23 characterized in that said second set of springs are radially displaced from said second clutch pack.

27. The planetary transmission of claim 23 characterized in that said first set of springs are displaced radially outwards from said first clutch pack.

28. A planetary transmission for a vehicle comprising stationary housing, means to connect said stationary housing to the vehicle, a sun gear, means to rotate said sun gear, planet gears, the outer part of said planet gears being spaced from the axis of said sun gear by a first distance, said planet gears surrounding said sun gear, a planet carrier, means to connect said planet gears to said planet carrier, said planet carrier having a section laterally displaced of said planet gears, said section being spaced from the axis of the sun gear by a distance, said distance being less than said first distance, a first clutch pack, a first set of stationary springs, said first set of springs activating said first clutch pack through a bearing that allows rotation of said first clutch pack to connect said section of said planet carrier to lock said planet carrier to said sun gear for rotation therewith, a first piston, said first piston overriding said first set of springs to disconnect said section of said planet carrier from said sun gear to allow the rotation of said planet carrier in respect to said sun gear, a ring gear, said ring gear surrounding said planet gears, said ring gear having a section laterally displaced of said planet gears, said section being spaced from the axis of said sun gear by a second distance, said second distance being less than said first distance, a second clutch pack, a second set of stationary springs, said second set of springs activating said second clutch pack to connect said laterally displaced section of said ring gear to said stationary housing to prevent the rotation of said ring gear, a second piston, said second piston overriding said second set of springs to disconnect said laterally displaced section of said ring gear from said stationary housing to allow the rotation of said ring gear, and operation means to selectively move said first and second pistons to override their respective sets of springs so as to alter the operative condition of the planetary transmission.

29. The planetary transmission of claim 28 characterized in that said second distance is less than said distance.

30. The planetary transmission of claim 28 characterized in that said first clutch pack is located radially inward of said planet carrier inside of said first distance from the axis of said sun gear.

31. The planetary transmission of claim 28 characterized in that said second set of springs are radially displaced from said second clutch pack.

32. The planetary transmission of claim 28 characterized in that said first set of springs are displaced radially outwards from said first clutch pack.

33. A planetary transmission comprising a sun gear, means to rotate said sun gear, planet gears, said planet gears surrounding said sun gear, a planet carrier, means to connect said planet gears to said planet carrier, means to connect said planet carrier to an output for the transmission, a first clutch pack, a first set of springs, said first set of springs activating said first clutch pack to connect said planet carrier to said sun gear for rotation therewith, a first means to override said first set of springs to disconnect said planet carrier from said sun gear, a stationary housing, a ring gear, said ring gear surrounding said planet gears, a second clutch pack, a second set of springs, said second set of springs activating said second clutch pack to connect said ring gear to said stationary housing to prevent the rotation of said ring gear, a second means to override said second set of springs to disconnect said ring gear from said stationary housing and operation means to selectively operate said first and second means so as to alter the operative condition of the planetary transmission into a first speed condition, a second speed condition, a braking condition and a neutral condition.

* * * * *